Figure 1:
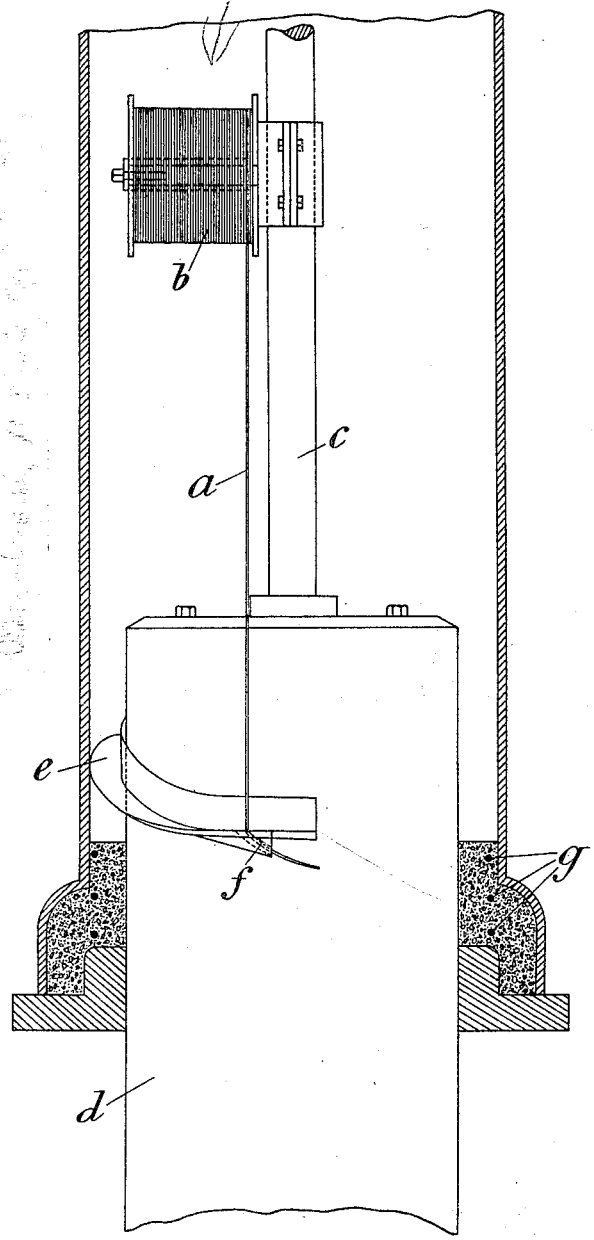

No. 887,255. PATENTED MAY 12, 1908.
O. KJELLSTRÖM.
MANUFACTURE OF CONCRETE AND LIKE PIPES.
APPLICATION FILED JUNE 19, 1906.

3 SHEETS—SHEET 1.

WITNESSES:
George G. Schoenlank
W. H. Berrigan

INVENTOR,
OLOF KJELLSTRÖM,
BY
H. Van Oldenneel
Attorney.

No. 887,255. PATENTED MAY 12, 1908.
O. KJELLSTRÖM.
MANUFACTURE OF CONCRETE AND LIKE PIPES.
APPLICATION FILED JUNE 19, 1906.

No. 887,255. PATENTED MAY 12, 1908.
O. KJELLSTRÖM.
MANUFACTURE OF CONCRETE AND LIKE PIPES.
APPLICATION FILED JUNE 19, 1906.

3 SHEETS—SHEET 3.

WITNESSES:
George G. Schoenlank
N. H. Berrigan

INVENTOR,
OLOF KJELLSTRÖM,
BY H. van Dedenneel
Attorney.

UNITED STATES PATENT OFFICE.

OLOF KJELLSTRÖM, OF STOCKHOLM, SWEDEN.

MANUFACTURE OF CONCRETE AND LIKE PIPES.

No. 887,255.  Specification of Letters Patent.  Patented May 12, 1908.

Application filed June 19, 1906. Serial No. 322,414.

*To all whom it may concern:*

Be it known that I, OLOF KJELLSTRÖM, manager of Skånska Cementgjuteriet Co., Ltd., Stockholm, Sweden, a citizen of the Kingdom of Sweden, residing at Sveavägen 104, Stockholm, Sweden, have invented new and useful Improvements in or Relating to the Manufacture of Concrete and Like Pipes; and I do hereby declare the following to be a full, clear, and exact description of the same.

This invention relates to reinforced concrete and like pipes and differs from reinforced pipes as at present known by means of the reinforcement being deposited in the wall of the pipe in the form of wire or metallic bands disposed as a continual screw thread or helix. Both in regard to strength and weight this pipe is a considerable improvement on pipes hitherto known, the latter being provided with a more or less stiff and clumsy reinforcement of iron, which is deposited with considerable unevenness in the wall of the pipe.

The screw threads in accordance with the present invention may be placed comparatively closely together, thereby also rendering a comparatively slender inlay or reinforcement sufficient. The most characteristic feature of the present pipe is however that in each case a pipe of homogeneous construction has a corresponding continuous reinforcement therein. A pipe thus composed can easily be made strong enough to stand an internal pressure of 15–20 atmospheres.

The laying in of the wire spiral in the cement pipe is effected by placing the wire or metallic band in the substance of the pipe before the latter is completed, namely either at the same time as the new layers of material are added to those previously pressed or at some other and somewhat earlier stage of the molding, but in all cases before the complete pipe is fully pressed.

The most convenient method for reinforcement by the wire-spirals consists in using the method described in Patent No. 658067 for the molding of the pipe itself and in conjunction therewith making the wire assume the shape of a continual spiral by means of the screw-movement of a guide and at the same time laying it in the pipe. The new method can thus be used advantageously in connection with the method described in the above patent specification, by making the molding of the pipe and the inlaying the spiral keep pace with each other so that the material is always inlaid exactly at the spot where the helically advancing compression of the mortar is taking place. When the two methods are used in connection with each other, another advantage is that a very simple construction of machinery may be used, the drum serving for the pressing of the pipe and provided with screw-projections also serving as a guide for the wire which issues through an opening made therein and is forced to be placed continually in the pipe layers while the latter are being pressed together. It is evident, however, that the new method may also be very well used in connection with other methods for molding pipes as for instance when the mass of concrete or the like is first shaped as a pipe and the wire then placed from within into the tubular mass which is finally pressed, whereby the spiral grooves produced by the inlay in the wall of the pipe will be closed at the same time.

In the accompanying drawings three different apparatus are shown for simultaneously pressing and reinforcing a cement pipe. It will however be understood from what has already been stated that other apparatus may also be used for performing the process.

The machine shown in Fig. 1 is of the kind described in the American Patent Specification No. 658067. In this form the outer mold may be placed on a base plate while the body or drum $d$, on which are fixed one or more screw-projections $e$ moves upwards through the mass with which the mold has been filled. On the spindle $c$ of the drum is placed, in accordance with the present invention a reel $b$, from which latter the wire or reinforcing band $a$ is fed. The wire is led through a hole in the screw-projection $e$ and then through a small guide tube $f$ on the under side of the projection to insure its being fed tangentially to the cylindrical surface of the drum. Various means may be employed to prevent the wire being pulled up through the pipe as for instance a knot may be tied at its lower end, or the end of the wire tied round a piece of metal.

Figure 2:
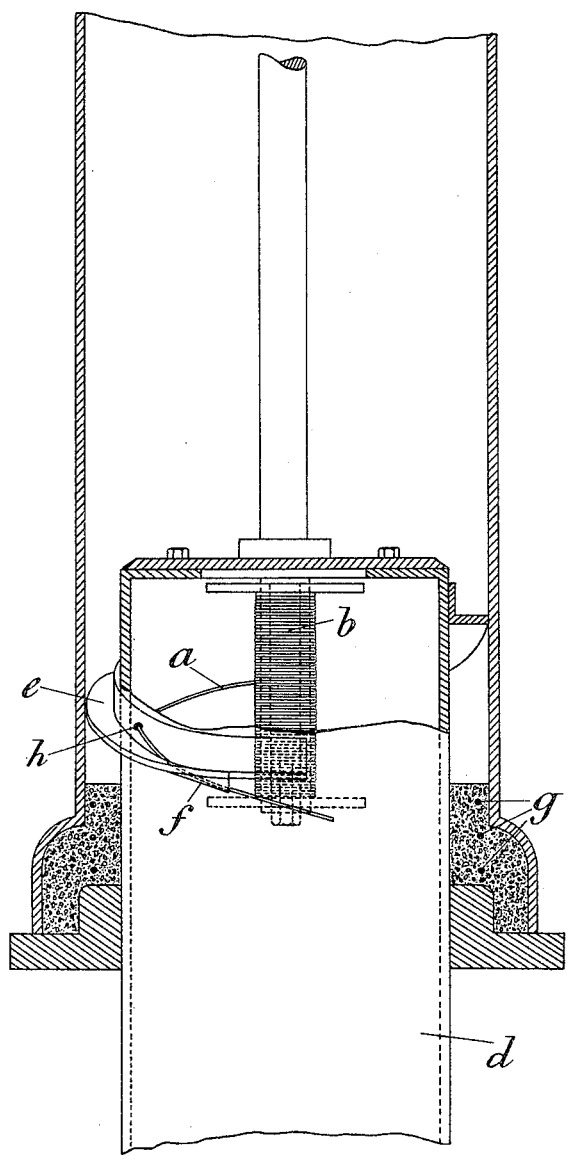

In Fig. 2 another form of apparatus is shown, which only differs from the one already described in that the reel $b$ is placed within the drum $d$ on an extension of the spindle *c*. The wire *a* is led radially out through a hole in the wall of the drum and thereafter down through the projection *e* and through a guide tube *f* fixed to the latter in the manner already described with reference to Fig. 1.

Figure 3:
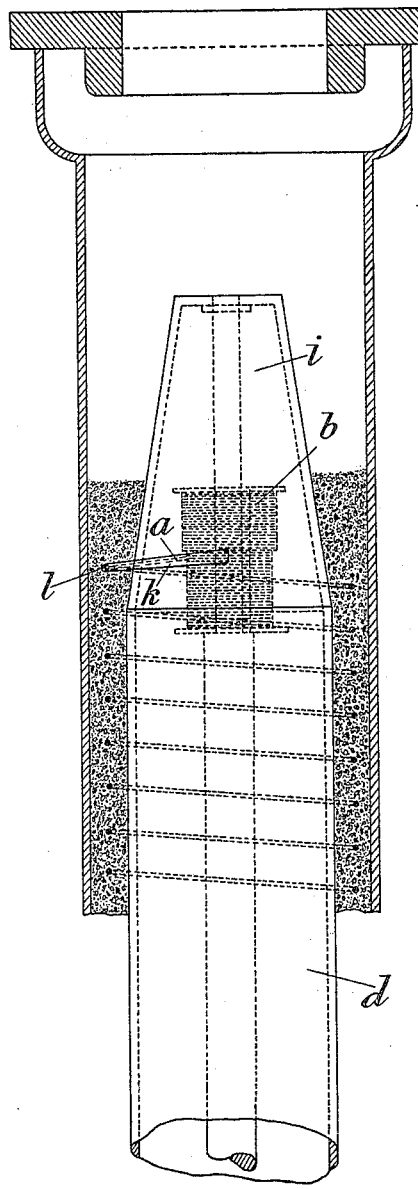

In the arrangement shown in Fig. 3 a thick-walled pipe is first made in any suitable manner, and the material is subsequently compressed by a rotating tapering mandrel being passed through the pipe thus diminishing the thickness of its walls. According to the present invention the conical mandrel *i* is provided with a projecting guide pipe *l*, a suitable distance from the connecting passage to the adjoining cylindrical drum, from the outer end of which conducting pipe the wire fed from the reel *b* is led out into the concrete. In this apparatus the reel *b* is again mounted within the molding body and upon the spindle of the latter.

If several wires are to be inlaid at the same time a corresponding number of reels and guides may be employed. Further it is an advantage as practical experiments have shown that the concrete used for the molding of the pipes be in a moister condition than has hitherto been possible thus making the pipes more water-tight.

It is immaterial for the present invention whether the screw-movement causing the reinforcement in screw-form be produced in one way or in another, and especially whether the drum or the conducting piece alone performs the movements in question, or whether they are performed by the outer mold inclosing the pipe, or whether the drum and the mold each performs one of these movements, the drum rotating and the mold moving longitudinally or conversely. Furthermore it is of no consequence in which direction the reinforcement takes place whether from above, from below or laterally.

Having thus described my invention, what I claim, and desire to secure by Letters Patent of the United States, is:—

1. Apparatus for producing reinforced pipes of concrete or like material, comprising a revoluble core and an outer shell which supports the pipe until completed, one of said parts being movable lengthwise of the other, a helical guiding plate secured upon and revoluble with the core, for screwing said core through the material held by the shell and compressing it, and means for continuously supplying wire underneath the guiding plate as the latter is revolved in the concrete between the shell and the core.

2. Apparatus for producing reinforced pipes of concrete or the like material, comprising a revoluble core and an outer shell which supports the pipe until completed, one of said parts being movable lengthwise of the other, a helical guiding plate secured upon the exterior of the core and revoluble therewith, for screwing said core through the material held by the shell and compressing it, and said plate having a passage provided with an exit opening at the under side of the plate, in combination with means for continuously supplying wire through said passage as the core and plate are revolved.

3. Apparatus for producing reinforced pipes of concrete or like material, comprising an outer shell which supports the pipe until completed, and a revoluble core therein having a tapering end, a helical guiding device upon the exterior of said tapering end, and means for continuously supplying wire underneath the guiding device as the latter is revolved.

In testimony whereof, I have signed my name to this specification in the presence of two subscribing witnesses.

O. KJELLSTRÖM.

Witnesses:
 JOHN BLOMQVIST,
 N. H. DAHL.